United States Patent [19]

Cohen

[11] Patent Number: 5,699,176
[45] Date of Patent: Dec. 16, 1997

[54] UPGRADABLE FIBER-COAX NETWORK

[75] Inventor: Leonard G. Cohen, Atlanta, Ga.

[73] Assignee: Lucent Technologies Inc., Murray Hill, N.J.

[21] Appl. No.: 554,332

[22] Filed: Nov. 6, 1995

[51] Int. Cl.$^6$ .................................... H04B 10/20; H04B 10/00
[52] U.S. Cl. ........................... 359/118; 359/167; 359/179
[58] Field of Search ................................. 359/118, 124, 359/128, 110, 164, 167, 168, 173, 341, 179; 385/24

[56] References Cited

U.S. PATENT DOCUMENTS

| | | | |
|---|---|---|---|
| 4,904,042 | 2/1990 | Dragone | 350/96.16 |
| 4,904,050 | 2/1990 | Dunn et al. | 350/96.29 |
| 4,976,507 | 12/1990 | Udd | 350/96.18 |
| 5,046,848 | 9/1991 | Udd | 356/345 |
| 5,136,671 | 8/1992 | Dragone | 385/46 |
| 5,153,763 | 10/1992 | Pidgeon | 359/125 |
| 5,285,305 | 2/1994 | Cohen et al. | 359/110 |
| 5,309,534 | 5/1994 | Cohen et al. | 385/27 |
| 5,355,208 | 10/1994 | Crawford et al. | 356/35.5 |
| 5,355,401 | 10/1994 | Skinner | 379/56 |
| 5,440,335 | 8/1995 | Beveridge | 348/13 |
| 5,488,413 | 1/1996 | Elder et al. | 348/13 |

*Primary Examiner*—Wellington Chin
*Assistant Examiner*—Rafael Bacares

[57] ABSTRACT

A fiber-coax network (30) includes feeder fiber (14) from a central office/headend (10) to a distribution node (32). At the distribution node, the transmissions are routed and distributed via successively a cable-coax node (16), a first PON node (36), and a second PON node (84). Each PON node comprises one or more passive optic component such as an optic splitter or wavelength division multiplexer (WDM). The cable-coax node provides broadcast CATV to subscribers via a coax distribution network (18) having spaced line extension amplifiers (LEAs) (26) in order to service more subscribers. The first PON node (36) provides switched telecommunication services (including ISDN) to subscribers via distribution fibers (38) which terminate at respective optic network units (ONUs) (40) that are co-located with an LEA (26) and connect to the coax distribution network downstream of the LEA (26). The second PON node (84) provides wireless services (including PCS) to subscribers within a predefined geographic area referred to as a microcell (82) via distribution fibers (86) which terminate at respective lightwave microcell transceivers (88) co-located with an LEA (26) and ONU (40). The co-located LEAs (20), ONUs (40), and LMTs are housed in a common multimedia enclosure (94). Further, the health of the network is monitored with fiber sensor loops (52, 62).

12 Claims, 9 Drawing Sheets

RF-SPECTRUM ALLOCATION

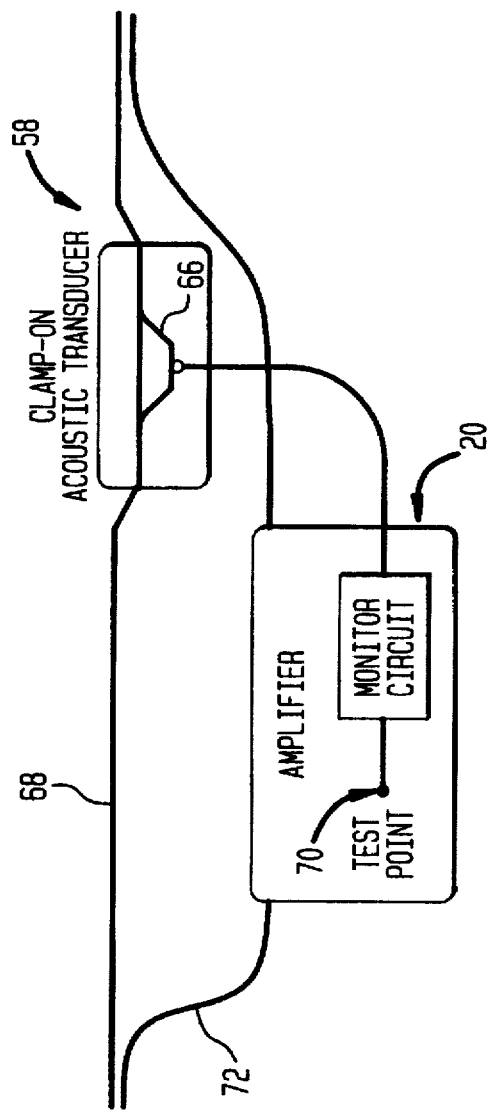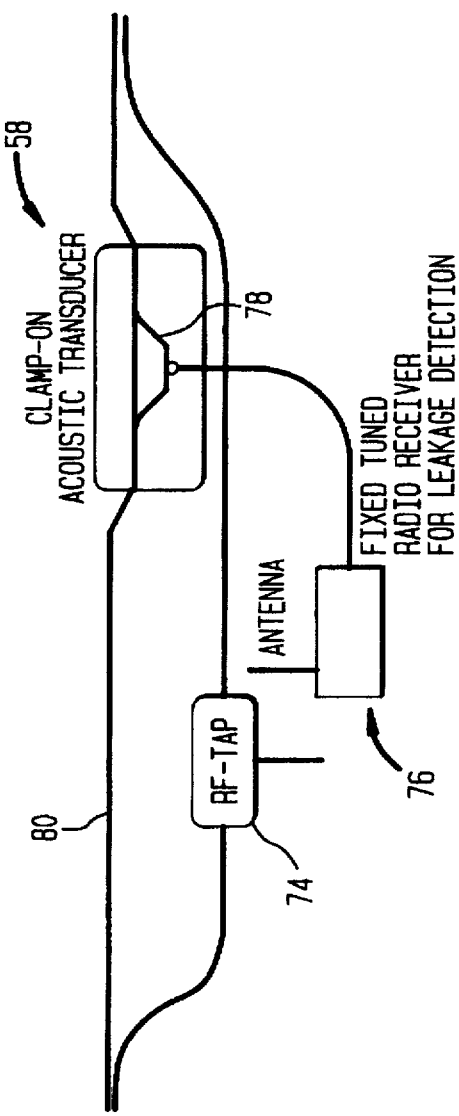

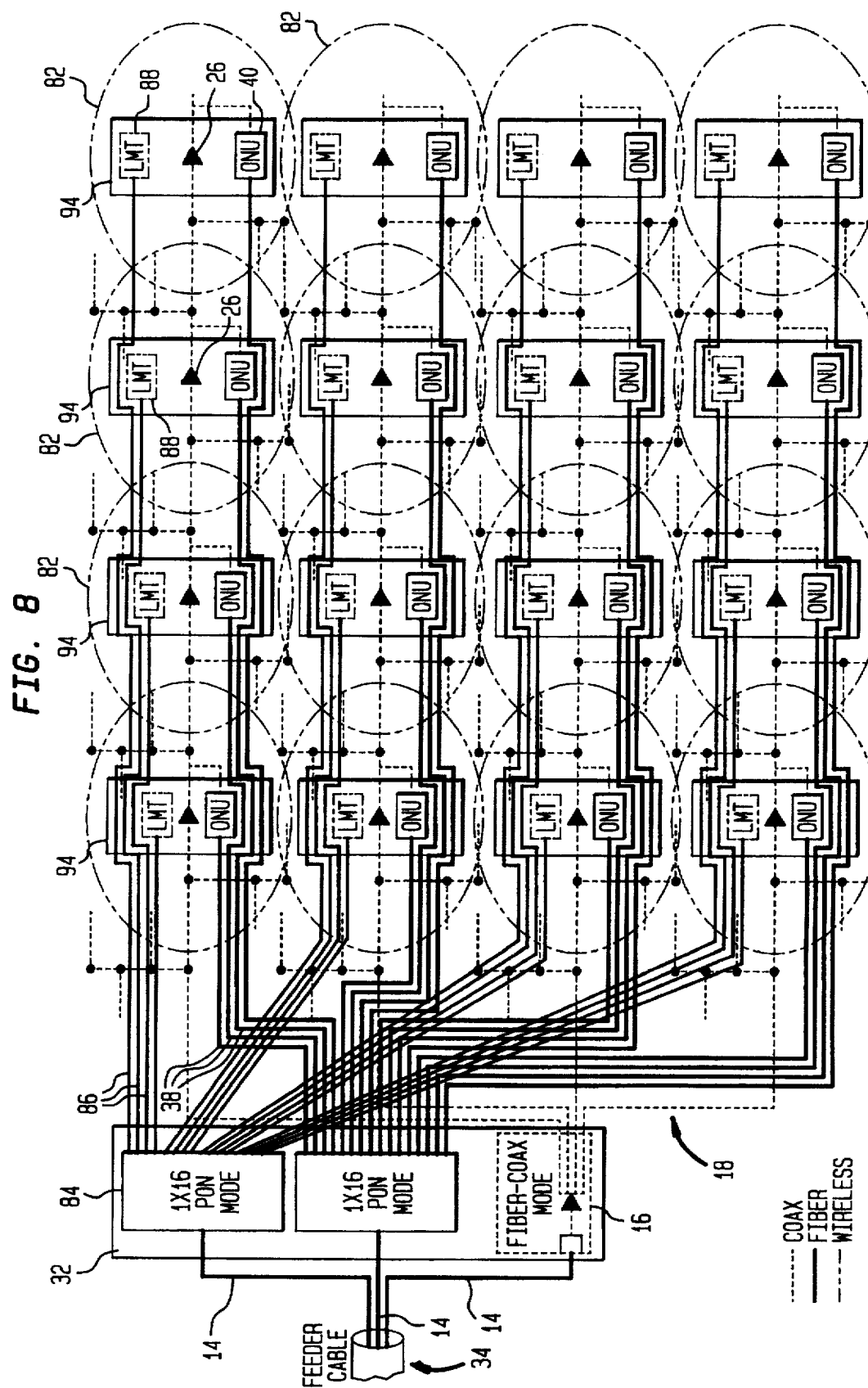

UPGRADABLE FIBER-COAX NETWORK

FIELD OF THE INVENTION

This invention generally relates to hybrid fiber optic-coax cable networks, and more particularly, to a network that includes an optical fiber installed along side the coax distribution network, up to and by passing the line extension amplifiers of the coax distribution network.

BACKGROUND OF THE INVENTION

The ability to provide the consumer with a greater number of electronic services has become increasingly important for commercial success in the telecommunication industry. As has recently become the case, the long distance telecommunication exchange companies, the local area exchange companies, and local cable access television (CATV) companies have all sought out the technology to provide multiple media services to the local subscribers, such as an individual or a business. The services sought to be provided by any one of the above concerns includes enhanced pay-per view, video-on-demand, interactive television, interactive games, image networking, video conversing, video telephony, CATV, and telephone switched services (including ISDN). In order to provide any combination of the above services in an economically viable manner, a distribution network of substantial capacity is required. Capacity, in this sense, refers primarily to the information carrying capability, which is substantially related to the broadcast frequency spectrum bandwidth of the transmission medium. Further, the network must be capable of being upgraded for the next evolution in broadband access architecture.

As an example, FIG. 1 graphically illustrates the radio frequency spectrum allocation, as dictated by the Federal Communications Commission (FCC). From FIG. 1 we can see that in order for a network to provide switched telecommunication services, CATV, and wireless services (including PCS), the transmission medium would require a broadband capability of approximately 1200 MHz.

A transmission medium having the capacity necessary to provide the above-referenced services is optical fiber. It is fully expected that at some point in the future all subscribers will have optical fiber run into their home or office, though it is not economically prudent to deploy an all fiber network infrastructure at one time. Consequently, alternative network architectures are being conceived and implemented which will eventually, over a number of years, allow the evolution to an all fiber network.

A network architecture presently being considered is a hybrid fiber optic-coaxial cable (hereafter referred to as fiber-coax) network in which feeder fibers run from a telephone system central office (e.g., the location of a telecommunication network switch) and/or headend (e.g., the location of a CATV receiver) to a fiber-coax distribution node remotely located with respect to the central office/ headend. At the fiber-coax distribution node, the fiber lines are interfaced with a coaxial cable distribution network that distributes the signals transmitted across the feeder fibers to numerous subscribers. A more detailed discussion of this architecture can be found, for example, in Proceedings, Vol. 2, pp. 289–340, 10th Annual National Fiber Optic Engineer Conference, Jun. 12–16, 1994, San Diego, Calif.

With reference to FIG. 2, an exemplary network of this type of architecture is illustrated. In general, narrowband telephonic and broadband video signals are transmitted between a central office and/or head end 10, through a local carrier exchange 12, if required, and a multiplicity of fiber-coax distribution nodes 16 via feeder fibers 14. At each fiber-coax node 16, the transmitted signals are coupled between the feeder fibers 14 and an active coax network 18. The active coax network 18 further distributes the narrowband and broadband services to the individual subscribers beyond the fiber-coax node 16. An optical receiver 20 converts the optical signals into electrical signals and an amplifier 22 amplifies that signal for transmission on the coax network 18. At each fiber-coax node 16, a power splitter (not shown) splits the electrical signals into each trunk 24 of the coax network 18. In order to increase the number of subscribers served by each fiber-coax distribution node, multiple rf-amplifiers 26, referred to hereafter as line extension amplifiers (LEAs), are used to extend the distribution length of the trunks 24.

This architecture has not yet proven to be adequate because, inter alia, the coax distribution networks do not appear to meet the reliability requirements necessary to provide a viable service. Further, proposals to modify this architecture in order to provide a fiber-passive coax network are only capable of serving relatively few subscribers, and thus, require many more feeder fibers to terminate at the fiber-coax distribution node than economically feasible. Moreover, the upstream bandwidth (5–50 MHz) of this architecture is inadequate for high bandwidth services and is also susceptible to noise ingress (through connectors) that is particularly high at the low frequencies used for upstream transmission.

Accordingly, it can be seen that a need exists for a network architecture that meets the present transmission needs and provides means for a graceful evolution path for moving life line services onto an all fiber network.

SUMMARY OF THE INVENTION

Briefly stated, the present invention is an upgradable fiber-coax network that includes passive optic components at each fiber-coax distribution node that enables optical fiber to be deployed beyond the fiber-coax distribution nodes alongside the coax distribution network up to each of the line extender amplifiers (LEAs), summarily referred to hereafter as fiber-to-the-amplifier (FTTA) architecture. This architecture provides a graceful evolution path for moving switch telecommunication services off an active coax distribution network and onto a fiber optic network that terminates at remotely located optic network units (ONUs). Preferably, the ONUs are substantially co-located with LEAs of the coax distribution network. Further, the ONUs connect to the coax network through passive coax links that bypass the LEAs, and thereby enable both the monitoring of the coax network to provide insurance against reliability problems associated with active coax networks and the transmission of high bandwidth services both upstream and downstream.

In addition, the FTTA architecture provides a convenient fiber access network for a wireless system comprising microcells centered at each LEA/ONU location. The fiber-microcell network architecture overlays the fiber-coax network and provides wireless services to subscribers within an approximately defined geographic region of the microcell, typically a 300 meter radius which coincides with the LEA spacing.

In a preferred embodiment of the present invention, the LEA (for broadcast CATV), ONU (for switched telecommunication services), and LMT (for wireless services) are co-located and encased in a loop enclosure. A feature of the present invention is a fiber sensor loop for monitoring intrusions along the fiber feeder and at discrete points along the coax distribution network, and therefore, making the coax network passive in the sense that all monitoring can be performed at the central office/headend without active intervention on-site. This includes monitoring coax apparatus such as the LEAs and taps to drop cables.

BRIEF DESCRIPTION OF THE DRAWINGS

The present invention, as defined in the claims, can be better understood with reference to the following drawings. The drawings are not necessarily to scale, emphasis instead being placed upon clearly illustrating the principles of the present invention.

FIG. 6 is a schematic drawing illustrating a line extension amplifier remote monitor scheme in accordance with the present invention;

FIG. 7 is a schematic drawing illustrating a tap leakage monitor scheme in accordance with the present invention;

FIG. 8 is a schematic drawing illustrating a fiber-passive coax and wireless network in accordance with the present invention;

DETAILED DESCRIPTION OF THE PREFERRED EMBODIMENT

Figure 1:
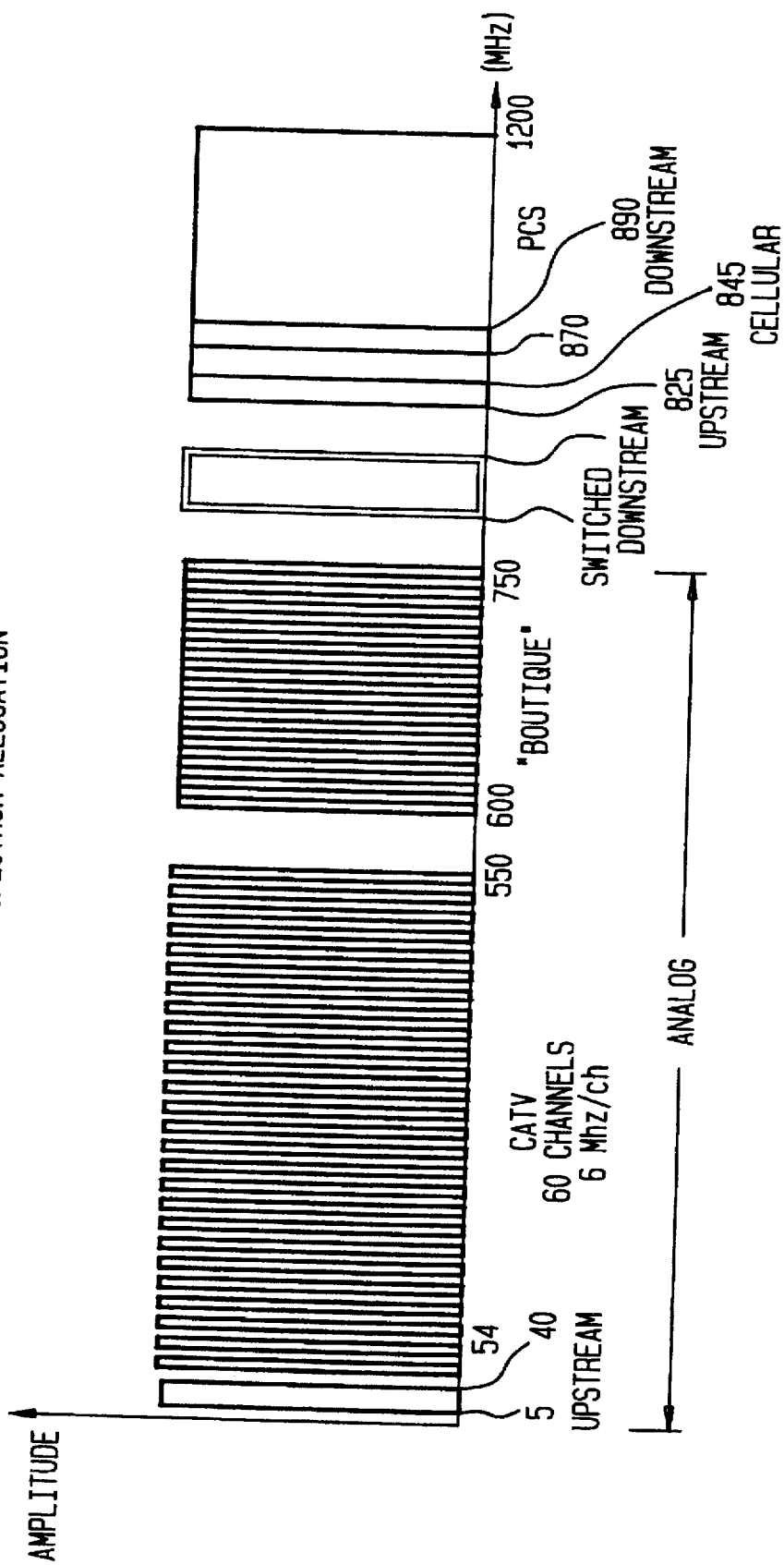
FIG. 1 is a graphical illustration of the radio frequency spectrum allocation set by the FCC.
Figure 2:
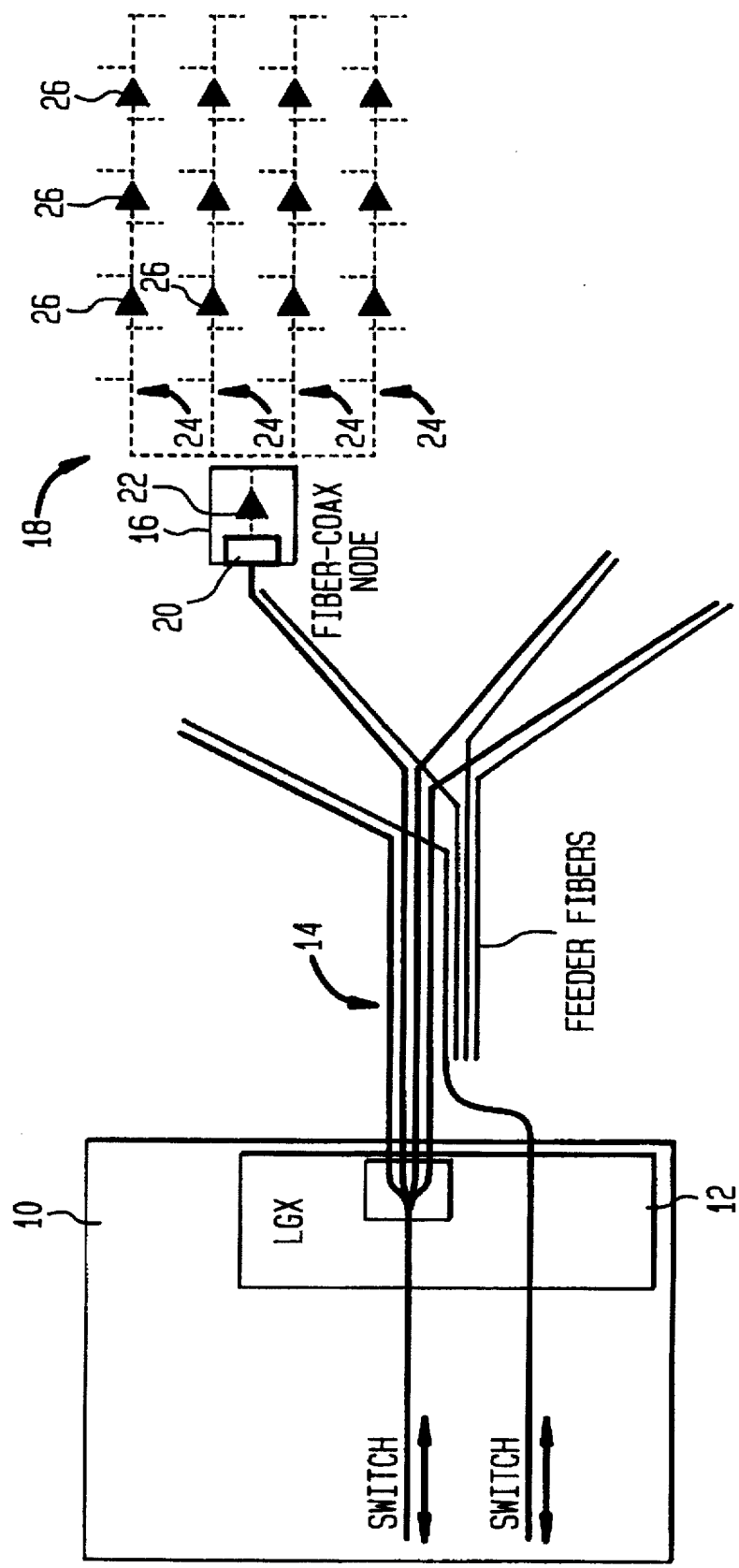
FIG. 2 is a schematic drawing illustrating a fiber-coax network architecture of the prior art.
Figure 3:
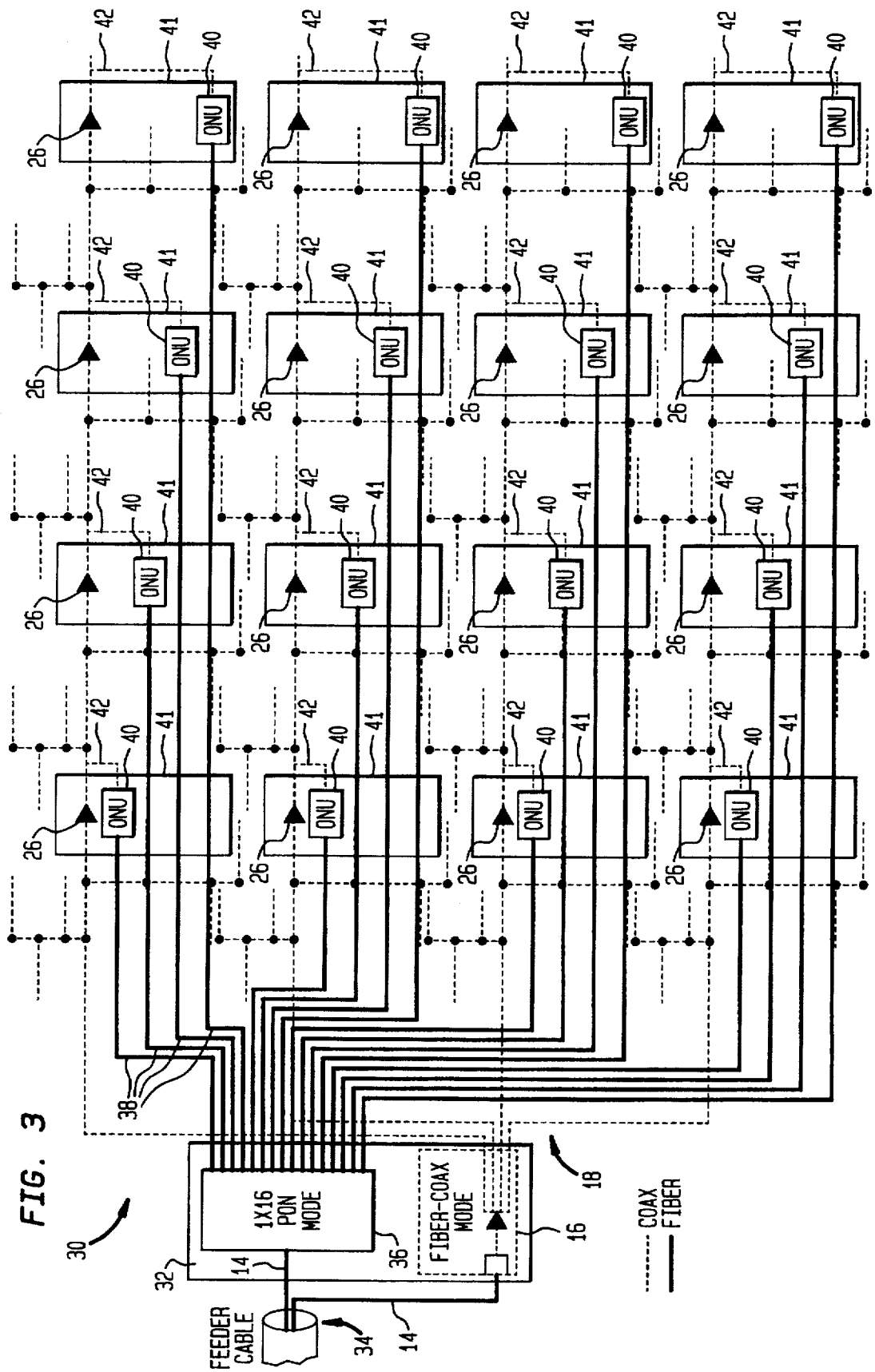
FIG. 3 is a schematic drawing illustrating a fiber-passive coax network architecture in accordance with the present invention.

With reference to the drawings wherein like reference numerals represent corresponding parts throughout the several views, FIG. 3 illustrates an upgradable fiber-passive coax network 30 in accordance with the present invention wherein an optical fiber is deployed from each distribution node 32 to substantially all of the LEAs 26 of the corresponding coax network 18. Several of the advantages of this FTTA architecture are that it provides a graceful evolution path for providing fiber to a subscriber's home or office, a mechanism for monitoring the coax network, and a convenient access for a wireless system. Further, the cost of installing the fiber is dramatically reduced by laying it along-side the coax cable.

The network 30, as shown in FIG. 3, comprises a feeder cable 34 that delivers feeder fibers 14 from a telephone system central office (CO) or headend to a distribution node 32. The distribution node 32 includes a fiber-coax distribution node 16 and a passive optic network (PON) node 36, both of which are coupled to respective feeder fibers 14. For purposes of illustrating the present invention, each feeder fiber 14 is unidirectional, and therefore, separate feeder fibers are required for upstream and downstream transmissions. Though several of the figures referenced herein only illustrate a single feeder fiber 14 for a particular service, it would be obvious to one of ordinary skill in the art to include a second parallel feeder fiber for transmission in the opposite direction.

The PON node 36 comprises one or more passive components for exchanging signals between a feeder fiber 14 and a plurality of distribution fibers 38. Typically, the passive components include an optical power splitter or a wavelength-division multiplexer (WDM) for distributing and/or routing the outbound signals into the distribution fibers 38. Components of this kind are described, for example, in U.S. Pat. No. 4,904,042 issued to Dragone and U.S. Pat. No. 5,136,671 also issued to Dragone. In order to reduce the size and provide greater convenience in handling and housing, such components can be fabricated using silicon optical bench (SiOB) technology so as to integrate the components on a single, silicon substrate and formatted on a silicon chip having connections for interfacing with optical fiber, as discussed in U.S. Pat. No. 5,285,305 issued to Cohen et al. Further discussion of SiOB technology can be found in C. H. Henry et al., "Glass Waveguides on Silicon for Hybrid Optical Packaging," IEEE Journal Lightwave Technology, Vol. 7, pp. 1530-1539 (1989). Advantages of fabricating these optical components on a single wafer or substrate include increased operational reliability and mass production capability.

Each of the distribution fibers 38 terminates at an optic network unit (ONU) 40 that is preferably co-located with an LEA 26 in a common enclosure 41, as shown in FIG. 3. Preferably, each ONU 40 is capable of sending and receiving signals so as to be able to communicate bidirectionally with distribution node 32 by way of a single bidirectional fiber or a pair of unidirectional fibers, as described in U.S. Pat. No. 5,285,305 issued to Cohen et al. Thus, each distribution fiber 38 can be thought of as forming a passive optic network (PON) in conjunction with the feeder fiber and corresponding ONU. An advantage of this configuration is that PONs utilize point-to-multipoint architecture capable of interconnecting at the distribution node 32 a moderate number of feeder fibers 14 to many distribution fibers 38. For example, twelve feeder fibers 14 delivered to a distribution node 32 by a feeder cable 34 can feed into as many as 64 distribution fibers 38 extending from the distribution node 32 to respective LEA/ONU location.

Each ONU is connected to the coax distribution network 18 by a passive coax network link 42 that bypasses the co-located LEA 26, and thus, creates a fiber-passive coax network. Though the coax distribution network 18 illustrated in FIG. 3 utilizes a tree distribution topology, the architecture of the present invention is equally applicable to other local area topologies such as ring or star.

In network 30, the CATV broadband broadcast is continued to be provided over the active coax network 18 though the two-way switched telecommunication services (POTs, ISDN, and switched video) are provided over the PONs terminating at each ONU 40. This configuration alleviates many of the reliability problems incurred with active coax networks and provides a much higher bandwidth for upstream and downstream services. Further, once the FTTA architecture of network 30 has been installed, it is assumed that CO/headend transmission equipment will not have to be changed for future upgrades of the network to provide fiber into the subscriber's home or office. Even further, this segments the portions of network 30 that transmit the digital and CATV services which allows the leasing of an individual portion of network 30 that provides a particular service.

An advantage of the FTTA architecture of network 30 is the ability to provide a fiber sensor loop for monitoring intrusions along the feeder cable 34 and detecting faults at discrete points along the coax distribution network 18. The fiber sensor loop schemes presented below are based upon a Sagnac fiber loop interferometer within a fiber optic intrusion detection system (FOIDS) that can detect vibrations along a fiber cable. A detailed discussion of a FOIDS is provided in U.S. Pat. No. 4,904,050 issued to Dunn et al. Generally, a FOIDS system senses vibrational disturbances due to backhoe or other digging equipment along the feeder fibers 14, as well as vibrational disturbances generated at discrete points along the coax cable network 18. Different locations can be distinguished by assigning different vibrational frequencies to different monitoring points. As intrusions and/or vibrations are detected by an acoustic sensor 58 (FIG. 4), an identification signal or tone is transmitted back to the central office/headend via the sensor loop where the signal is evaluated and acted upon.

Figure 4:
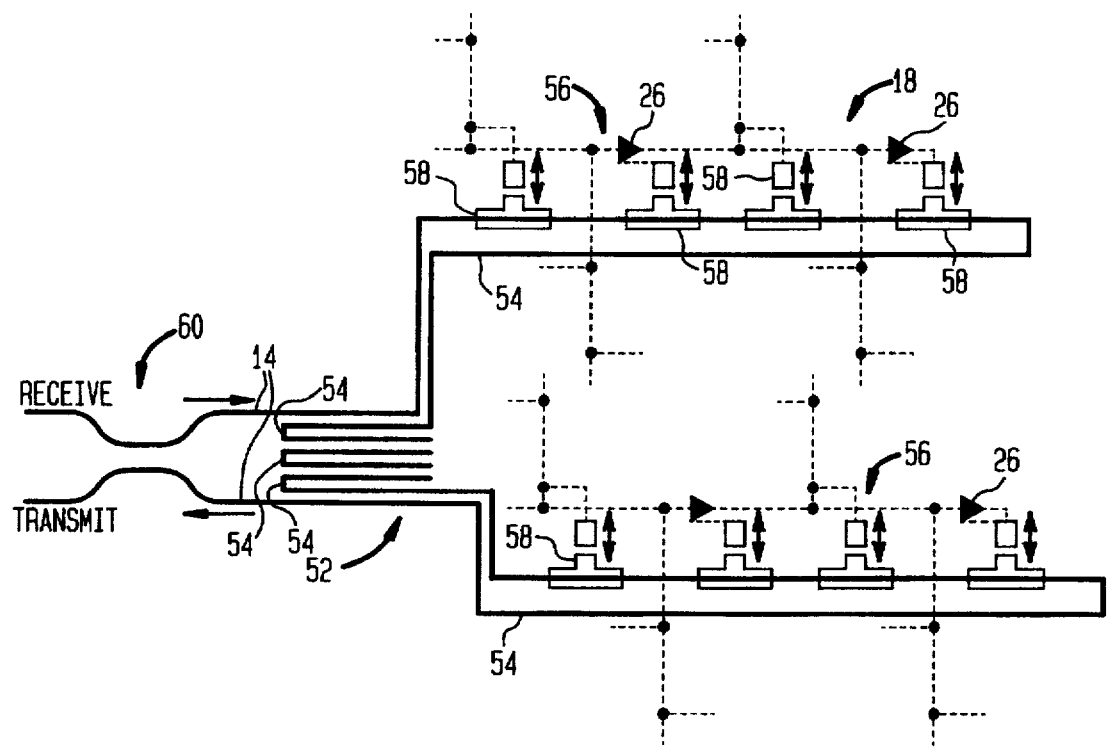
FIG. 4 is a schematic drawing illustrating alternative embodiments of a fiber looped sensor scheme for monitoring the coax distribution network of FIG. 3.

Referring to FIG. 4 a first proposed fiber sensor loop scheme comprises a single continuous loop 52 of fiber is configured by interconnecting two feeder fibers 14 with interconnecting loops 54, each interconnecting loop disposed along a coax trunk 56 of coax distribution network 18. Sensing devices, such as acoustic actuators 58, are spaced along each interconnecting loop 54 and are coupled to coax trunks 56, typically via an amplifier or tap as shown. In this scheme, a splitter 60 and the continuous loop 52 comprise the Sagnac fiber loop interferometer.

Figure 5:
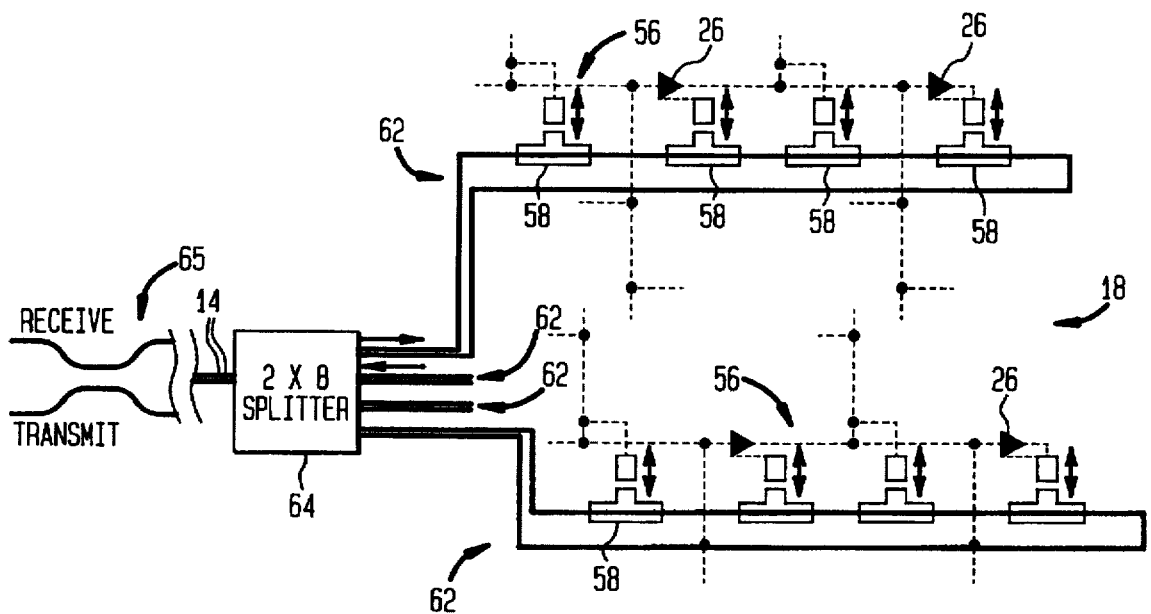
FIG. 5 is a schematic drawing illustrating alternative embodiments of a fiber looped sensor scheme for monitoring the coax distribution network of FIG. 3.

An alternative scheme for a fiber sensor loop is illustrated in FIG. 5 wherein four separate sub-loops 62 are disposed along respective coax trunks 56. The sub-loops 62 are fed by two feeder fibers 16 split by a 2×8 PON splitter 64 at the distribution node 32 (not shown). As with the previous configuration, acoustic actuators 58 are spaced along respective sub-loops 62 and are coupled to coax trunks 56 as shown. In this scheme, a splitter 65 and one of the sub-loops 62 comprise the Sagnac fiber loop interferometer.

A configuration for acoustic actuators 58 for monitoring the performance of an LEA 26 in the above manner is illustrated in FIG. 6. In this configuration, the acoustic actuator 58 can take the form of an acoustic transducer 66 (e.g., an electric speaker) that is placed in contact with a fiber 68 comprising the sensor loop. If the voltage at a test point 70 drops out of a predetermined range, then the LEA gain will become low and the acoustic transducer 66 couples an identification tone onto the fiber 68 contiguous with the coax cable 72. The energy due to the test point voltage change is stored in a long time-constant capacitor (not shown) to provide alarm power if there is signal power failure. The identification frequencies for discrete points of apparatus are chosen outside the signature frequencies characteristics of backhoes and other mechanical digging equipment.

In addition, a tap 74 to the coax drop cable of the coax network 18 can also be monitored in the above manner with the configuration illustrated in FIG. 7. In that configuration, the signal leakage through the tap 74 is monitored by a radio receiver 76. When the leakage radiation from the tap exceeds a predetermined level, an acoustic transducer 78 to couple an identification tone into a fiber 80 comprising the sensor loop. The radio receiver 76 is powered by inductive coupling to the current carrying copper wires in the sheath of the fiber 80.

Other suitable monitoring schemes can be individually incorporated with the FTTA architecture of the present invention as an alternative to the aforementioned scheme, such as the passive monitoring scheme of U.S. Pat. No. 5,285,305 issued to Cohen et al. or the intrusion detection scheme of U.S. Pat. No. 4,904,050 issued to Dunn et al.

The FTTA network 30 architecture also provides a convenient fiber access PON for a wireless system, as shown in FIG. 8, wherein wireless services can be provided to subscribers within microcells 82 centered about respective LEA/ONU locations. A second PON node 84 comprising an optical splitter is added to exchange the outbound/inbound signals between a feeder fiber 14 and a multiple number of distribution fibers 86. Each distribution fiber 86 is connected to a lightwave microcell transceivers (LMTs) 88 preferable co-located with a LEA 26. Because of the point-to-multipoint architecture of the PONs, there are enough feeder and distribution fibers to use separate PONs for downstream (outbound) and upstream (inbound) propagation of signals. However, it may be necessary to use an optical amplifier at the headend to overcome the insertion loss of the PON node 84 for upstream signals emitted from hand-sets inside the perimeter of a microcell 82. For instance, erbium-doped-fiber-amplifiers would be suitable for operation at wavelengths approximately at 1.55 μm.

Figure 9:
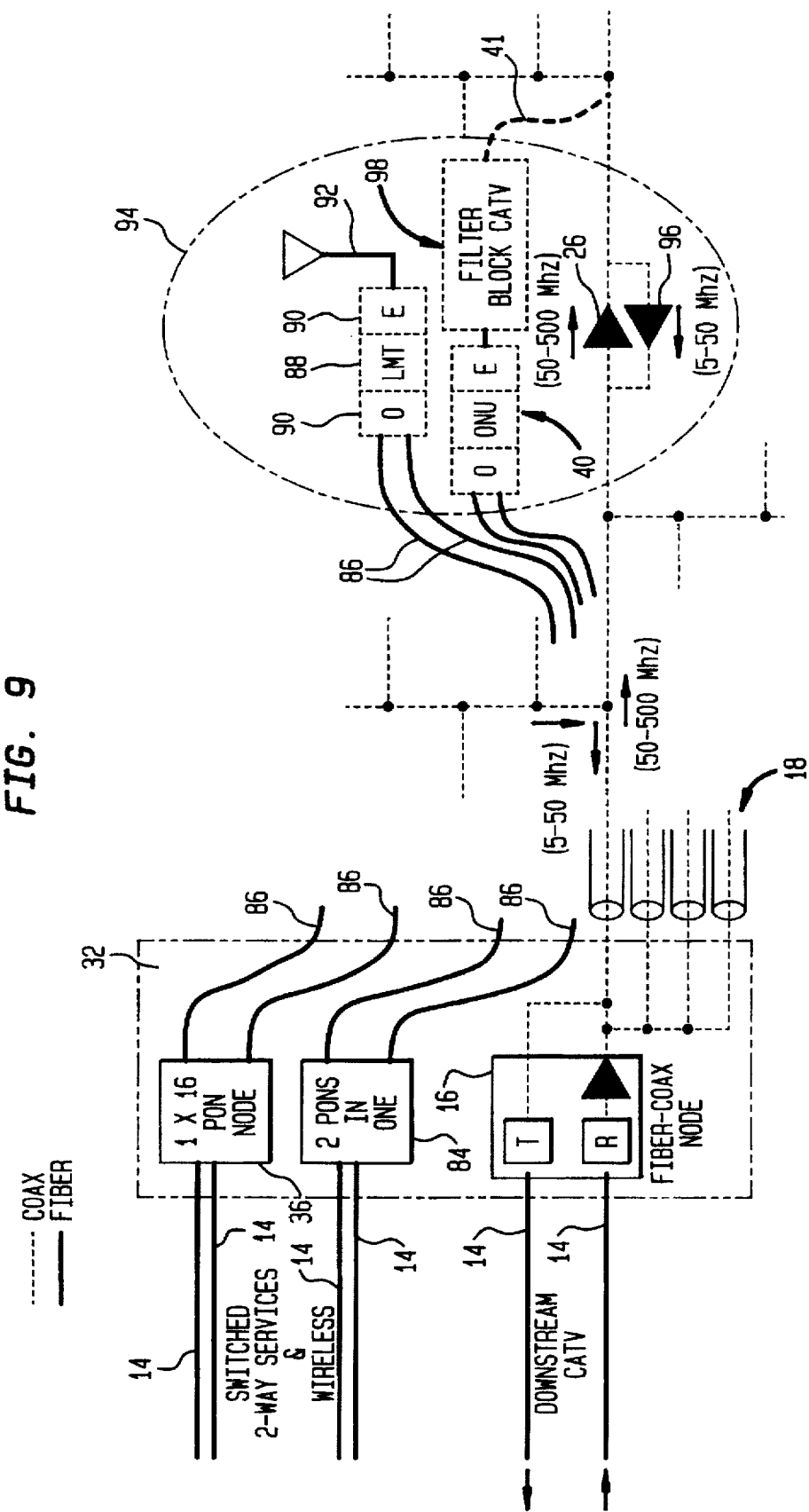
FIG. 9 is a schematic drawing illustrating the components implementing the passive optic network of FIG. 8.

In a preferred embodiment, each LMT 88 includes optoelectronics 90 and a radiation antenna 92 for interfacing distribution fibers 86 with free space media, as illustrated in FIG. 9. In addition, the PON node 84 preferably includes a two-PONs-in-one component rather than a standard 1×N splitter so specific WDM signals on feeder fiber 14 are sent to specific LTMs 88, in addition to signals simulcast to all LMTs 88 fed by a PON of PON node 84. Suitable two-PONs-in-one components are described in U.S. Pat. No. 5,285,305 issued to Cohen et al., U.S. Pat. No. 5,321,541 issued to L. G. Cohen and U.S. Pat. No. 5,440,416 issued to Cohen et al.

Another feature of the architecture of the network 30 is that LEA 26, ONU 40 and LMT 88 can be housed in a common multi-media enclosure 94. This configuration facilitates upgrading of the various components within the single housing 94. In addition to housing the aforementioned components, housing 94 can also enclose a rf amplifier 96 for amplifying upstream signals in the coaxial cable and a filter 98 for blocking upstream propagation of CATV signals on link 42 that connects ONU 40 to coax network 18. An advantage of providing common multi-media enclosure 94 is low-cost because a common housing can be used to house active components for coaxial cable, fiber-to-the-curb and wireless systems. It is also easier to install because the interconnection points are common. Further, a common enclosure is easier to maintain and administrate because the active components (points of failure) are also located at a common location.

In order to reduce the cost of LMTs 88, a modulator can be used in place of a laser as in the RITE-NET architecture described in N. J. Frigo et al., "A Wavelength-Division-Multiplexed Passive-Optical-Network with Cost-Shared Components," Photonics Technology Letters, Vol. 11, pp. 1365–1367, November (1994). The bandwidth of the LMT 88 components need only be approximately 20 MHz for current wireless systems but would have to be approximately 125 MHz for PCS services which could include high-speed data and video services.

Figure 10:
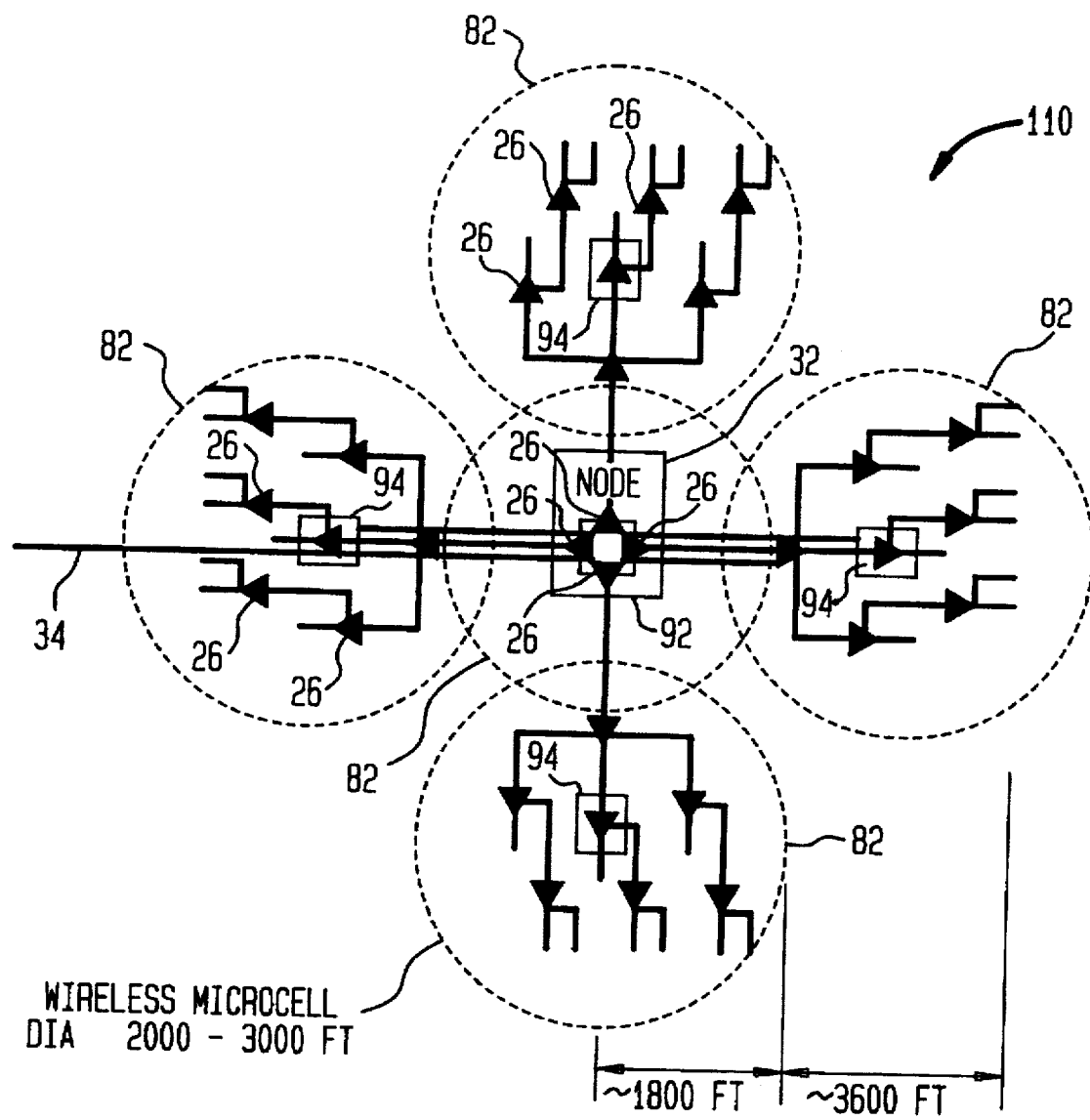
FIG. 10 is a schematic drawing illustrating an alternative distribution architecture of the present invention.
Figure 11:
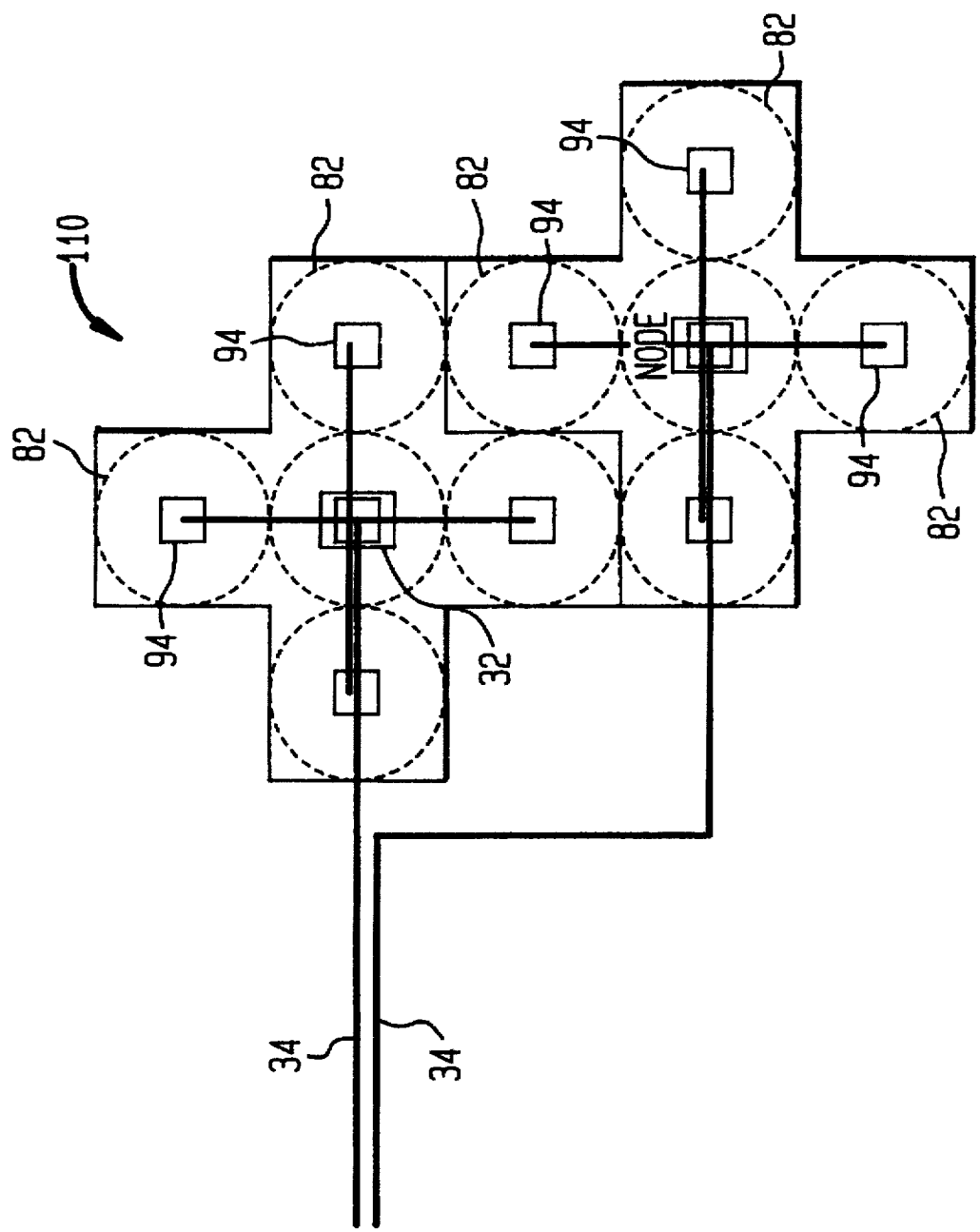
FIG. 11 is a schematic drawing illustrating yet another alternative distribution architecture of the present invention.

An alternative fiber-microcell architecture is a four quadrant local area distribution network 110 illustrated in FIG. 10. In the four quadrant network 110, the coax network is distributed into four quadrants from a single distribution node 32. Each quadrant uses an LEA 26 at the node 32 to split service into three coax lines, each having three concatenated LEAs 26. Though the FTTA architecture remains, it is not necessary to have fiber termination at every LEA 26. In fact, only one fiber is provided from the distribution node 32 to an enclosure 94. The enclosure 94 houses an ONU, LMT and LEA for each microcell 82. By interleaving the quadrants from different fiber coax nodes, as shown in FIG. 11 without the coax distribution network, broader cellular coverage is provided.

An advantage of the fiber-microcell overlay network architecture is the alleviation of problems that occur when wireless signals are mixed with other broadband services (e.g., CATV, data or POTS) on the same coax cable. As an example, radiation received at a coax-air interface may be re-radiated due to reflections returning from within the tree-and-branch architecture topology. In addition, if a mixer is used to down-convert wireless radiation from about 900 MHz, the second harmonic CATV signal noise (at about 450 MHz) may interfere with wireless information (about 900 MHz) received by the coax network element.

The value of the hybrid fiber-passive coax network 30 of the present invention which utilizes point-to-multipoint architecture is shown in Table A, set forth hereafter, which indicates how twelve feeder fibers 14 delivered to a distribution node 34 can be allocated for a full set of switched telecommunication and video services.

TABLE A

FEEDER FIBERS TO DISTRIBUTION NODE
(Each Node Serving 480 living units with
16 rf-amplifiers and 5 microcells)

| FEATURES | NUMBER OF FEEDER FIBERS | |
|---|---|---|
| | Point-to-Point | Point-to-Multipoint PON |
| Broadcast video | 1 | 1 |
| Upstream communications | 1 | 1 |
| Microcell access (5 cells) | 10 | 2 (1 × 5) |
| Upgrade for switched telecommunication (access to passive coax) | 32 | 2 (1 × 16) |
| Cable sensor fiber loops | 6 | 6 |
| TOTAL REQUIRED | 50 | 12 |
| TOTAL AVAILABLE | 12 | 12 |

As stated in Table A, broadcast video uses one downstream fiber to the active coax distribution network. Upstream communication for narrowband services and signaling for video-on-demand uses one upstream fiber. Switched telecommunication services are provided on unidirectional (two, 1×16) PONs that require two fibers and switched wireless services are on separate unidirectional (two, 1×5) PONs that require two fibers. This leaves six feeder fibers available to serve as three separate fiber sensor loops for monitoring the fiber and coax distribution networks. Alternative point-to-point evolution strategies require a total of fifty feeder fibers to a distribution node. This includes thirty-two fibers for telecommunication services, ten fibers for PCS services (wireless), two fibers for broadband and video-on-demand, and six fibers for fiber sensing.

It will be obvious to those skilled in the art that many modifications and variations may be made to the present invention as described above. The disclosure and description are intended to be illustrative and not in any sense limiting to the present invention, which is more preferably defined in scope by the following claims.

Wherefore, the following is claimed:

1. A hybrid fiber-coax network, comprising:
   a central office;
   a distribution node remotely located from said central office;
   a feeder fiber for permitting communication between said central office and said distribution node;
   a coax distribution network for permitting communication between said distribution node and subscribers within a local area network, said coax distribution network having spaced line extension amplifiers (LEAs) to extend the distribution length of the coax distribution network;
   a multiplicity of distribution fibers extending from said distribution node to respective optic network units (ONUs) terminations;
   a passive optic component located at said distribution node for exchanging transmissions between one of said feeder fibers and one of said multiplicity of distribution fibers; and
   wherein each of said ONUs is co-located with one of said LEAs and connected to said coax distribution network downstream of said co-located LEA so as to provide a passive optic network that bypasses said co-located LEA.

2. The network of claim 1, further including a light wave microcell transceiver (LMT) located at one of said ONU sites for interfacing fiber transmissions from one of said distribution fibers with wireless transmissions in a free space media.

3. The network of claim 1, wherein said LEA, ONU, and LMT are provided in a common enclosure.

4. The network of claim 1, further including monitoring means for monitoring said network for faults at discrete points along said coax distribution network and intrusions along said feeder and distribution fibers.

5. The network of claim 4, wherein said monitoring means comprises a fiber sensor loop including a Sagnac fiber loop interferometer.

6. A hybrid fiber-coax network comprising:
   a central office;
   a distribution node remotely located from said central office:
   a feeder fiber for permitting communication between said central office and said distribution node;
   a coax distribution network for permitting communication between said distribution node and subscribers within a local area network, said coax distribution network having spaced line extension amplifiers (LEAs) to extend the distribution length of the coax distribution network;
   a multiplicity of distribution fibers extending from said distribution node to respective optic network units (ONUs) terminations;
   a passive optic component located at said distribution node for exchanging transmission between one of said feeder fibers and one of said multiplicity of distribution fibers;
   wherein each of said ONUs is co-located with one of said LEAs and connected to said coax distribution network downstream of said co-located LEA so as to provide a passive optic network that bypasses said co-located LEA;
   including monitoring means for monitoring said network for faults at discrete points along said coax distribution network and intrusions along said feeder and distribution fibers wherein said monitoring means comprises a fiber sensor loop including a Sagnac fiber loop interferometer; and wherein said fiber sensor loop comprises a single continuous loop interconnecting two feeder fibers, said continuous loop comprising multiple interconnecting loops, each said interconnecting loop in communication with at least one of said ONU sites.

7. The network of claim 6, wherein said fiber sensor loop further includes a plurality of sensing devices disposed at spaced intervals along said continuous loop and configured to couple an identifying tone onto said continuous loop identifying said sensing device when a fault is detected.

8. A hybrid fiber-coax network comprising:

a central office;

a distribution node remotely located from said central office;

a feeder fiber for permitting communication between said central office and said distribution node;

a coax distribution network for permitting communication between said distribution node and subscribers within a local area network, said coax distribution network having spaced line extension amplifiers (LEAs) to extend the distribution length of the coax distribution network;

a multiplicity of distribution fibers extending from said distribution node to respective optic network units (ONUs) terminations;

a passive optic component located at said distribution node for exchanging transmission between one of said feeder fibers and one of said multiplicity of distribution fibers;

wherein each of said ONUs is co-located with one of said LEAs and connected to said coax distribution network downstream of said co-located LEA so as to provide a passive optic network that bypasses said co-located LEA;

including monitoring means for monitoring said network for faults at discrete points along said coax distribution network and intrusions along said feeder and distribution fibers;

wherein said monitoring means comprises a fiber sensor loop including a Sagnac fiber loop interferometer; and wherein said fiber sensor loop comprises a optic splitter interconnecting two feeder fibers with multiple sensor sub-loops, and wherein each of said sensor sub-loops is in communication with one or more of said ONU sites.

9. The network of claim 8, wherein said fiber sensor loop further includes a plurality of sensing devices disposed at spaced intervals along each of said sub-loops and configured to couple an identifying tone onto said sub-loop identifying said sensing device when a fault is detected.

10. The network of claim 1, wherein said passive optic component comprises a two-PON-in-one component.

11. A hybrid fiber-passive coax network, comprising:

a central office;

a distribution node remotely located to said central office;

a feeder cable extending from said central office to said distribution node, said feeder cable including two optical fiber lines;

a coax distribution network coupled to a first said optical fiber line of said feeder cable at said distribution node, said network including a plurality of coax cables for distributing transmissions from said fiber line to subscribers within a defined geographic area, said coax distribution network including line extension amplifiers located at spaced intervals along said coax cable for extending the distribution of the transmissions to more subscribers; and a fiber distribution network coupled to a second said optical fiber line of said feeder cable at said distribution node, said fiber distribution network including a plurality of distribution fibers for distributing transmissions from said second optical fiber line to subscribers, said distribution fibers terminating at optical network unit terminations located adjacent said line extension amplifiers, wherein each said optical network unit is connected to said coax distribution network downstream of said corresponding line extension amplifiers so as to bypass said line extension amplifiers.

12. A hybrid fiber-coax network including a feeder fiber for permitting transmissions between a central office and a distribution node remotely located to the central office and a coax distribution network for permitting transmissions between the distribution node and subscribers, the coax distribution network having spaced line extension amplifiers to extend the distribution length of the coax distribution network, and further comprising:

a passive optical network parallel to the fiber-coax network and including a second feeder fiber for permitting transmissions between the central office to the distribution node, splitting means co-located at the distribution node for passively splitting the transmissions on said second feeder from the central office into multiple distribution fibers, each of said distribution fibers terminating at an optical network unit located with one of the line extension amplifiers of the coax distribution network, each said optical network unit connecting said terminated distribution fiber to the coax distribution network past the co-located line extension amplifier;

wherein said passive optical network bypasses each of the co-located line extension amplifiers.

* * * * *